United States Patent
Lozhkin

(10) Patent No.: US 9,509,404 B2
(45) Date of Patent: Nov. 29, 2016

(54) WIRELESS TRANSMISSION SYSTEM AND DISTORTION COMPENSATION METHOD

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/847,313

(22) Filed: Sep. 8, 2015

(65) Prior Publication Data

US 2016/0127041 A1  May 5, 2016

(30) Foreign Application Priority Data

Oct. 30, 2014 (JP) ................. 2014-221956

(51) Int. Cl.
*H04B 10/00* (2013.01)
*H04B 10/2507* (2013.01)
*H04B 10/2575* (2013.01)
*H04B 10/2525* (2013.01)

(52) U.S. Cl.
CPC ...... *H04B 10/2507* (2013.01); *H04B 10/2575* (2013.01); *H04B 10/25253* (2013.01)

(58) Field of Classification Search
CPC .......... H04B 10/2507; H04B 10/2575; H04B 10/25751; H04B 10/25752; H04B 10/25759; H04B 10/1121; H04B 10/11; H04B 10/1125; H04B 10/1129; H04B 10/25253
USPC .................................................. 398/158, 159
See application file for complete search history.

(56) References Cited

U.S. PATENT DOCUMENTS

| 6,643,469 | B1 | 11/2003 | Gfeller et al. |
| 6,813,448 | B1* | 11/2004 | Chiappetta ......... H04B 10/2537 398/147 |
| 7,426,350 | B1* | 9/2008 | Sun .................. H04B 10/25137 398/159 |
| RE44,647 | E * | 12/2013 | Iannelli ...................... 398/186 |
| 2009/0060070 | A1* | 3/2009 | Hayase .................. H04L 5/006 375/260 |
| 2015/0365056 | A1* | 12/2015 | Lozhkin ................ H03F 1/3247 330/149 |
| 2016/0050017 | A1* | 2/2016 | Lesea ................. H04B 10/2507 398/147 |
| 2016/0112134 | A1* | 4/2016 | Masunaga ........ H04B 10/25752 398/115 |

FOREIGN PATENT DOCUMENTS

| JP | 2001-285204 | 10/2001 |
| JP | 2001-523913 | 11/2001 |
| JP | 3373842 | 2/2003 |
| JP | 2004-80350 | 3/2004 |
| JP | 2014-103571 | 6/2014 |
| WO | 99/26364 | 5/1999 |

* cited by examiner

Primary Examiner — M. R. Sedighian
(74) Attorney, Agent, or Firm — Fujitsu Patent Center

(57) ABSTRACT

A wireless transmission system includes a base station device connected to a wireless device by an optical transmission member. The base station device includes an acquiring unit that acquires a distortion component that corresponds to a level of a transmission signal, an amplifying unit that amplifies the distortion component at a predetermined gain, and a transmitting unit that transmits the transmission signal and the amplified distortion component in a separable manner. The wireless device includes a receiving unit that receives the transmission signal and the distortion component, a filtering unit that filters the transmission signal, an attenuating unit that attenuates the distortion component at a gain inverse of the predetermined gain, a combining unit that combines the filtered transmission signal with the attenuated distortion component to obtain a combined signal, and an amplifier that amplifies the combined signal.

6 Claims, 12 Drawing Sheets

FIG.6
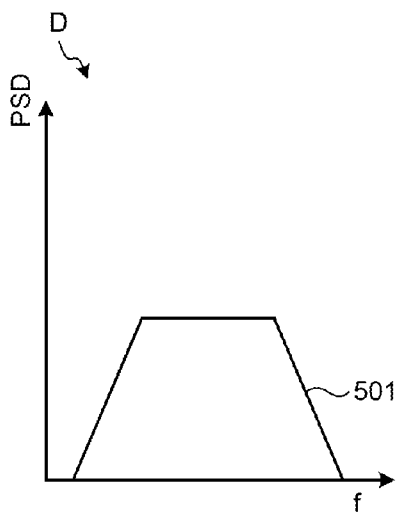
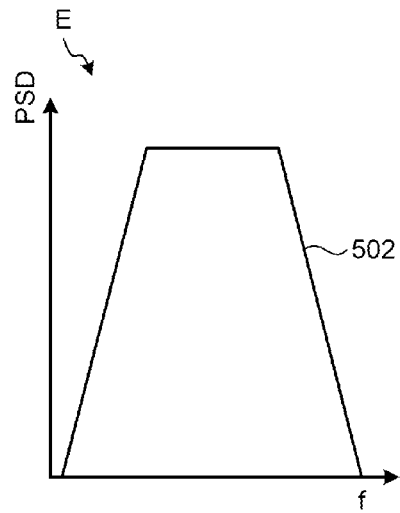
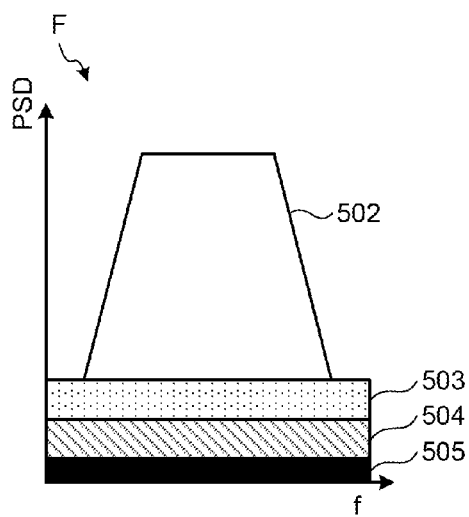
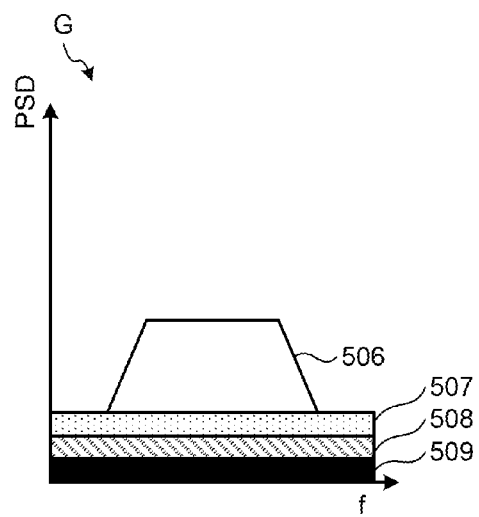

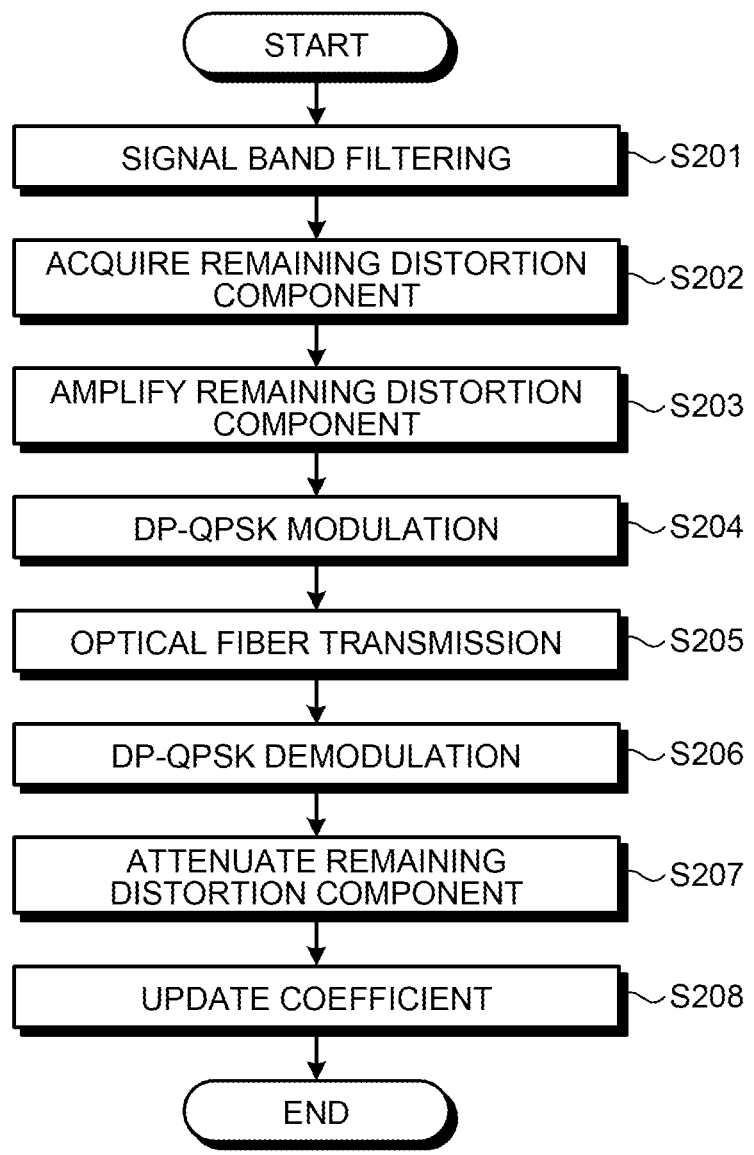

WIRELESS TRANSMISSION SYSTEM AND DISTORTION COMPENSATION METHOD

CROSS-REFERENCE TO RELATED APPLICATION

This application is based upon and claims the benefit of priority of the prior Japanese Patent Application No. 2014-221956, filed on Oct. 30, 2014, the entire contents of which are incorporated herein by reference.

FIELD

The embodiments discussed herein are related to a wireless transmission system and a distortion compensation method.

BACKGROUND

In recent years, studies have been conducted on a system in which a base station device and a wireless device are connected by an optical fiber by using a technology called, for example, Radio on Fiber (RoF). In RoF, a wireless transmission signal is optically modulated by the base station device, is transmitted by the optical fiber to the wireless device placed in remote site, is amplified by the wireless device, and is then wirelessly transmitted. Accordingly, for example, it is possible to configure a system in which multiple wireless devices are connected to a single base station device, processes to be performed on a signal are collectively performed by the base station device, and the signal is wirelessly transmitted from each of the wireless devices. Consequently, the overall cost of a wireless communication system can be reduced.

In general, an amplifier is provided in a RoF wireless device in order to amplify a signal and then the signal is wirelessly transmitted. Normally, if an input level to an amplifier is relatively small, the linearity of the input and output signals is maintained, whereas, if an input level to an amplifier increases and an output level approaches the saturation level, the input and output of signals become nonlinear due to inter modulation distortion. Consequently, when an amplifier is operated at around the saturation level in which the power efficiency is high, the amplifier needs to be operated in a nonlinear region in which the input and output of signals become nonlinear.

When an amplifier is operated in a nonlinear region, it is preferable that inter modulation distortion generated in the amplifier be compensated. Specifically, by compensating inter modulation distortion that is generated at the time of amplification, it is possible to maximize the performance of the amplifier. In recent years, a predistortion method is often used, as a distortion compensation method, in which a distortion component that cancels out the inter modulation distortion generated in the amplifier is previously given to a transmission signal.

Patent document 1: Japanese Laid-open Patent Publication No. 2014-103571

However, if the predistortion method is used in the RoF system, there is a problem in that the distortion component added to the transmission signal is masked and thus it is difficult to sufficiently perform distortion compensation.

Specifically, if the predistortion method is used in the RoF system, a distortion component associated with inter modulation distortion generated in the amplifier is added to a transmission signal in the base station device. Then, the transmission signal is transmitted to a wireless device by using an optical fiber; however, the transmission by using the optical fiber brings noise, such as thermal noise, shot noise of a photodiode, relative intensity noise (RIN) of a light source. Accordingly, because noise is added to the transmission signal when the transmission signal is transmitted to the wireless device by the optical fiber, a relatively small level of a distortion component is masked by the noise.

Consequently, when the transmission signal is amplified by the amplifier, the inter modulation distortion is not sufficiently compensated and thus the degradation of adjacent channel leakage ratio (ACLR) occurs.

SUMMARY

According to an aspect of an embodiment, a wireless transmission system includes a base station device connected to a wireless device by an optical transmission member. The base station device includes an acquiring unit that acquires a distortion component that corresponds to a level of a transmission signal, an amplifying unit that amplifies the distortion component acquired by the acquiring unit at a predetermined gain, and a transmitting unit that transmits, to the wireless device via the optical transmission member, the transmission signal and the distortion component amplified by the amplifying unit in a separable manner. The wireless device includes a receiving unit that receives the transmission signal and the distortion component transmitted by the transmitting unit, a filtering unit that filters the transmission signal received by the receiving unit at a predetermined frequency band, an attenuating unit that attenuates the distortion component received by the receiving unit at a gain inverse of the predetermined gain used by the amplifying unit, a combining unit that combines the transmission signal filtered by the filtering unit with the distortion component attenuated by the attenuating unit to obtain a combined signal, and an amplifier that amplifies the combined signal obtained by the combining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating a process related to a distortion component;

FIG. 12 is a flowchart illustrating a coefficient update process according to the second embodiment.

DESCRIPTION OF EMBODIMENTS

Preferred embodiments of the present invention will be explained with reference to accompanying drawings. The present invention is not limited to these embodiments.

[a] First Embodiment

Figure 1:
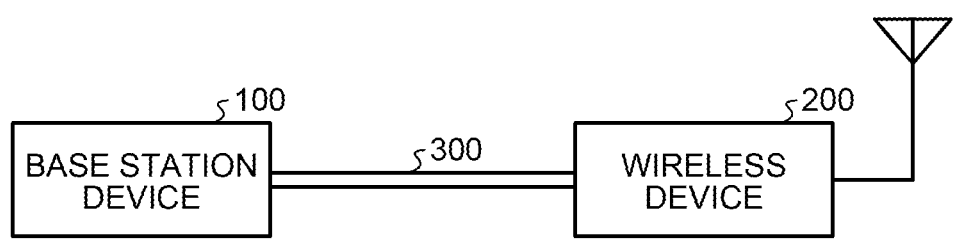
FIG. 1 is a schematic diagram illustrating the configuration of a wireless transmission system according to a first embodiment.

FIG. 1 is a schematic diagram illustrating the configuration of a wireless transmission system according to a first embodiment. The wireless transmission system has the configuration in which a base station device 100 is connected to a wireless device 200 by an optical fiber 300. FIG. 1 illustrates a case in which the single wireless device 200 is connected to the base station device 100; however, multiple numbers of the wireless devices 200 may also be connected to the base station device 100.

The base station device 100 generates a transmission signal, performs optical modulation on the transmission signal, and then transmits the signal to the wireless device 200 via the optical fiber 300. Furthermore, the base station device 100 optically modulates a distortion component that is associated with inter modulation distortion generated in an amplifier in the wireless device 200 and then transmits the distortion component to the wireless device 200 by using the optical fiber 300. Namely, the base station device 100 separately transmits the transmission signal and the distortion component to the wireless device 200 by using the optical fiber 300. Furthermore, the base station device 100 amplifies the distortion component to the same level as that of the transmission signal and then performs optical modulation. The specific configuration of the base station device 100 will be described in detail later.

The wireless device 200 combines a transmission signal transmitted from the base station device 100 with a distortion component, amplifies the transmission signal with which the distortion component is combined, and performs wireless transmission. At this point, the wireless device 200 attenuates the distortion component to the level that was used before the amplification and then combines the distortion component with the transmission signal. The specific configuration of the wireless device 200 will be described in detail later.

The optical fiber 300 connects the base station device 100 to the wireless device 200. The optical fiber 300 may also be a single optical fiber or may also be an optical fiber cable formed by multiple optical fibers.

Figure 2:
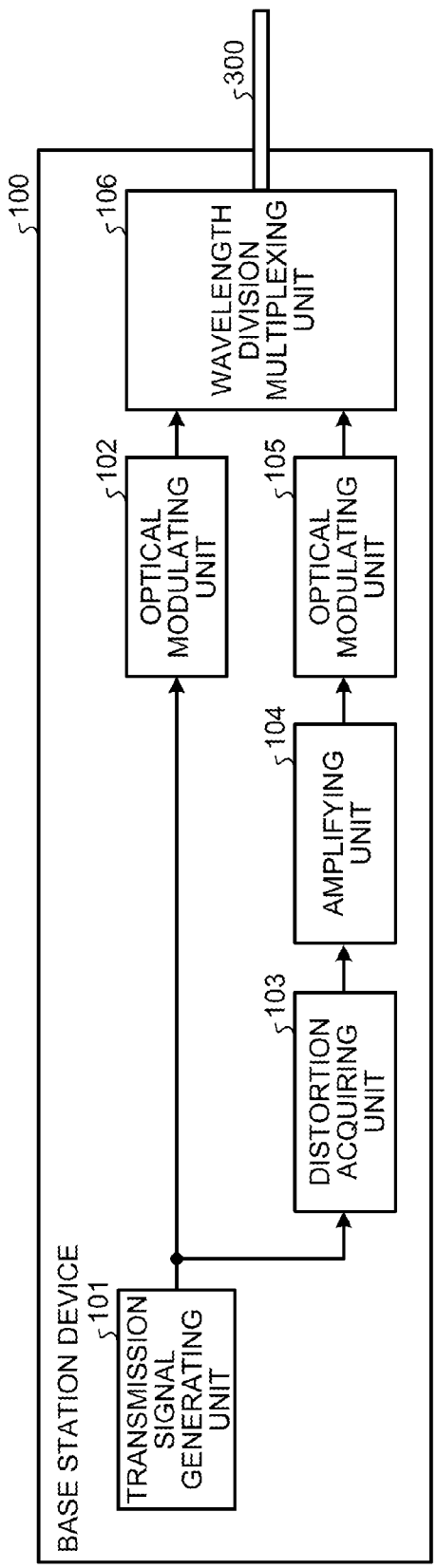
FIG. 2 is a block diagram illustrating the configuration of a base station device according to the first embodiment.

FIG. 2 is a block diagram illustrating the configuration of the base station device 100 according to the first embodiment. The base station device 100 illustrated in FIG. 2 includes a transmission signal generating unit 101, an optical modulating unit 102, a distortion acquiring unit 103, an amplifying unit 104, an optical modulating unit 105, and a wavelength division multiplexing unit 106.

The transmission signal generating unit 101 encodes and modulates data and generates a transmission signal. The transmission signal generated by the transmission signal generating unit 101 is an electrical signal.

The optical modulating unit 102 optically modulates the transmission signal generated by the transmission signal generating unit 101. Specifically, by using a modulation technique, such as differential quadrature phase shift keying (DQPSK) modulation or the like, the optical modulating unit 102 superimposes the transmission signal that is an electrical signal onto light emitted from a light source.

The distortion acquiring unit 103 acquires a distortion component that is associated with the level of the transmission signal generated by the transmission signal generating unit 101. Namely, the distortion acquiring unit 103 acquires a distortion component that is used to cancel out inter modulation distortion that is generated in the amplifier included in the wireless device 200. At this point, the distortion acquiring unit 103 may also acquire a distortion component that is associated with the level of the transmission signal by using, for example, a memory polynomial or may also acquire the distortion component that is associated with the level of the transmission signal by referring to a look-up table in which a distortion component is associated with the level of the transmission signal and is stored.

The amplifying unit 104 amplifies the distortion component acquired by the distortion acquiring unit 103. Specifically, the amplifying unit 104 amplifies the distortion component at a gain that is used to make the distortion component level the same as that of the transmission signal. Namely, a gain G used by the amplifying unit 104 is represented by Equation (1) below:

$$G = PSD_t / PSD_d \qquad (1)$$

where, $PSD_t$ is the power spectral density of a transmission signal and $PSD_d$ is the power spectral density of a distortion component. The power spectral density corresponds to the signal level.

The amplifying unit 104 may also measure the transmission signal level and the distortion component level in order to determine the gain G; however, the amplifying unit 104 may also use, as the gain G, a fixed value that is close to the value obtained by Equation (1) above. Namely, because distortion compensation is usually performed by repeatedly adjusting a distortion component that is added to a transmission signal, even if the gain G is not exactly an optimum value, the effect of the distortion compensation is concentrated due to the distortion component being repeatedly adjusted. The amplifying unit 104 outputs, to the optical modulating unit 105, the distortion component that has been amplified to the same level as that of the transmission signal.

The optical modulating unit 105 optically amplifies the distortion component that has been amplified by the amplifying unit 104. Specifically, similarly to the optical modulating unit 102, by using a modulation technique, such as DQPSK modulation or the like, the optical modulating unit 105 superimposes a distortion component that is an electrical signal onto light emitted from a light source. The wavelength of the light emitted from the light source of the optical modulating unit 102 is different from that of the optical modulating unit 105.

The wavelength division multiplexing unit 106 multiplexes the wavelength of the transmission signal that has been optically modulated by the optical modulating unit 102 onto the wavelength of the distortion component that has been optically modulated by the optical modulating unit 105. Namely, the wavelength division multiplexing unit 106 multiplexes the transmission signal onto the distortion component in a state in which the transmission signal can be separated from the distortion component. Then, the wavelength division multiplexing unit 106 transmits, to the wireless device 200 via the optical fiber 300, the optical signal that is acquired from wavelength multiplexing performed on the transmission signal and the distortion component.

Figure 3:
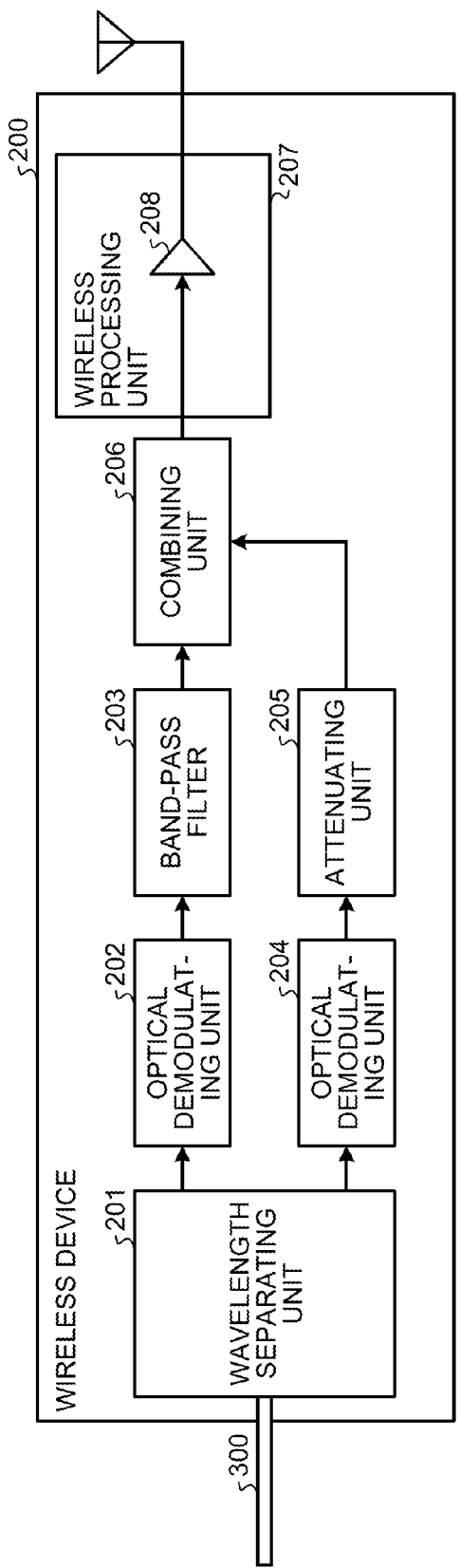
FIG. 3 is a block diagram illustrating the configuration of a wireless device according to the first embodiment.

FIG. 3 is a block diagram illustrating the configuration of the wireless device 200 according to the first embodiment. The wireless device 200 illustrated in FIG. 3 includes a wavelength separating unit 201, an optical demodulating unit 202, a band-pass filter 203, an optical demodulating unit 204, an attenuating unit 205, a combining unit 206, and a wireless processing unit 207.

The wavelength separating unit 201 receives an optical signal from the optical fiber 300 and separates the optical signal into light that has a wavelength onto which a transmission signal is superimposed and light that has a wavelength onto which a distortion component is superimposed.

The optical demodulating unit 202 demodulates the light that has the wavelength onto which the transmission signal is superimposed and then acquires a transmission signal that becomes an electrical signal. Then, the optical demodulating unit 202 outputs the transmission signal to the band-pass filter 203. In this transmission signal, in addition to thermal noise, noise, such as shot noise of a photodiode, relative intensity noise (RIN) of a light source, is added.

The band-pass filter 203 filters an output from the optical demodulating unit 202 by using the frequency band of the transmission signal, thereby removing the noise outside the frequency band of the transmission signal. Namely, because the frequency band of a transmission signal is previously determined, the band-pass filter 203 removes the noise outside the frequency band of the transmission signal by transmitting the signal with this frequency band.

The optical demodulating unit 204 demodulates the light that has the wavelength on which the distortion component is superimposed and then acquires a distortion component that becomes an electrical signal. Then, the optical demodulating unit 204 outputs the distortion component to the attenuating unit 205. In addition to thermal noise, noise, such as shot noise, RIN, or the like is added to this distortion component.

The attenuating unit 205 attenuates the distortion component at a gain inverse of the gain that has been used by the amplifying unit 104 in the base station device 100. Namely, the attenuating unit 205 attenuates the distortion component, which has been amplified by the base station device 100, to the original level. At this point, the attenuating unit 205 also attenuates the noise that has been added to the distortion component. Consequently, the noise level added to the distortion component is lower than that added to the transmission signal. Furthermore, when the amplifying unit 104 calculates a gain from the transmission signal and the distortion component level by using Equation (1), the attenuating unit 205 may also calculate a gain to be used for the attenuation by receiving a notification using, for example, a predetermined control signal or the like indicating a gain that was used by the amplifying unit 104.

The combining unit 206 combines the transmission signal, from which noise outside the frequency band of the transmission signal is removed, with the distortion component, in which noise is attenuated. Namely, the combining unit 206 performs a predistortion process that adds a distortion component to a transmission signal. The combining unit 206 also combines noise added to the transmission signal and noise added to the distortion component; however, only attenuated noise is present outside the frequency band of the combined transmission signal. Consequently, in the combined signal, it is possible to reduce the degree of masking, due to noise, of the distortion component that is added outside the frequency band of the transmission signal.

The wireless processing unit 207 includes an amplifier 208 and performs a predetermined wireless transmission process on a combined signal that is obtained by the combining unit 206. Specifically, the wireless processing unit 207 performs a wireless transmission process, such as digital/analogue (D/A) conversion, up-conversion, or the like. Then, the wireless processing unit 207 amplifies the signal subjected to the wireless transmission process by using the amplifier 208 and then wirelessly transmits the amplified signal via an antenna. In the amplifier 208, inter modulation distortion is generated outside the frequency band of the transmission signal; however, because a distortion component that cancels out the inter modulation distortion is added to the combined signal, the inter modulation distortion in the amplifier 208 can be reduced. Consequently, it is possible to suppress the degradation of the adjacent channel leakage ratio (ACLR).

Figure 4:
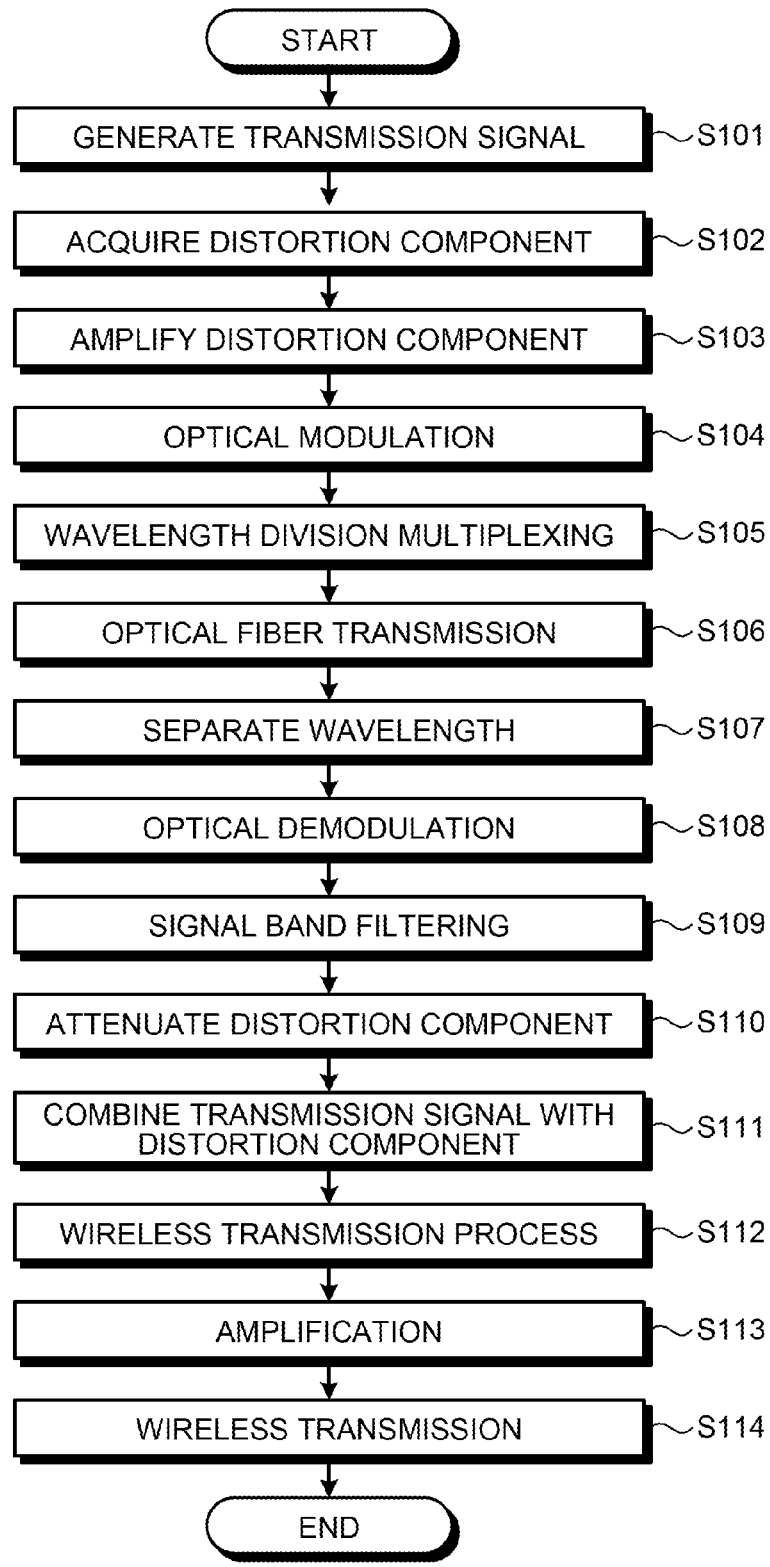
FIG. 4 is a flowchart illustrating the flow of a distortion compensation process according to the first embodiment.

In the following, the distortion compensation process performed by the wireless transmission system having the configuration described above will be described with reference to the flowchart illustrated in FIG. 4.

First, in the base station device 100, the transmission signal generating unit 101 generates a transmission signal (Step S101). Specifically, the transmission signal generating unit 101 encodes and modulates data and then generates a transmission signal used for wireless transmission. The generated transmission signal is output to the optical modulating unit 102 and the distortion acquiring unit 103.

Then, the distortion acquiring unit 103 acquires, on the basis of the level of the transmission signal, a distortion component that cancels out the inter modulation distortion generated in the amplifier 208 (Step S102). Namely, by performing, for example, memory polynomial or the like, a distortion component that is associated with the level of the transmission signal is acquired. Then, the distortion component is amplified to the same level as that of the transmission signal by the amplifying unit 104 (Step S103). Namely, the amplifying unit 104 uses a gain that corresponds to the ratio of the transmission signal level to the distortion component level, thus amplifying the distortion component. The gain used by the amplifying unit 104 may also be a fixed value.

Then, the optical modulation is performed on the transmission signal and the amplified distortion component (Step S104). Specifically, the optical modulating unit 102 uses, for example, a DQPSK modulation technique, thus superimposing the transmission signal onto light emitted from a light source. Furthermore, the optical modulating unit 105 uses, for example, the DQPSK modulation technique, thus superimposing the distortion component onto light emitted from a light source. At this point, the wavelength of the light used by the optical modulating unit 102 for the optical modulation is different from that used by the optical modulating unit 105 for the optical modulation.

In this way, if the transmission signal and the distortion component are superimposed onto each piece of light having different wavelengths, the pieces of the light are subjected to wavelength division multiplexing by the wavelength division multiplexing unit 106 (Step S105). Consequently, an optical signal is generated by the transmission signal and the distortion component being superimposed onto the light having different wavelengths. Then, the optical signal is transmitted to the wireless device 200 by the optical fiber 300 (Step S106).

An optical signal transmitted by the optical fiber 300 is received by the wavelength separating unit 201 in the wireless device 200. For example, a photodiode is used for receiving the optical signal. Then, from the optical signal received by the wavelength separating unit 201, the light that has a wavelength onto which the transmission signal is superimposed is separated from the light that has a wavelength onto which the distortion component is superimposed (Step S107). These two types of light are demodulated by the optical demodulating units 202 and 204 (Step S108) and then a transmission signal and a distortion component that become electrical signals can be obtained. In the transmission signal and the distortion component obtained in this way, noise due to the transmission passing through the optical fiber 300 is added. Namely, in addition to thermal noise, shot noise of a photodiode, and RIN of a light source are added to each of the transmission signal and the distortion component.

The transmission signal to which noise is added is subjected to filtering by the band-pass filter 203 (Step S109). Namely, a signal with a predetermined frequency band of the transmission signal is output from the band-pass filter 203 and noise outside the frequency band of the transmission signal is removed.

In contrast, the distortion component to which noise is added is attenuated by the attenuating unit 205 (Step S110). This attenuation is performed at the gain inverse of the gain that is used by the amplifying unit 104 to amplify the distortion component. Consequently, the distortion component level that has been attenuated by the attenuating unit 205 returns to the original level before the amplification is performed by the amplifying unit 104. Simultaneously, noise that is added to the distortion component is also attenuated. The level of the noise added to the distortion component is lower than the level of the noise added to the transmission signal.

Then, the transmission signal in which noise outside the frequency band of the transmission signal is combined with the distortion component that is attenuated to the original level by the combining unit 206 (Step S111) and the predistortion process for the inter modulation distortion generated in the amplifier 208 is performed. At this point, in the combining unit 206, the noise added to the transmission signal and the noise added to the distortion component are also combined; however, only the noise that is added to the distortion component and that is attenuated is present in the out-of-band transmission signal. Accordingly, the noise level in the frequency band associated with the distortion component of the combined signal acquired by the combining unit 206 is lower than that in the frequency band of the transmission signal. Consequently, the degree of masking, due to noise, of the distortion component is low and thus the effect of predistortion can be sufficiently obtained.

The combined signal obtained by the combining unit 206 is input to the wireless processing unit 207 and is subjected to a wireless transmission process, such as D/A conversion, up-conversion, or the like (Step S112). Then, the signal subjected to the wireless transmission process is amplified by the amplifier 208 (Step S113) and is wirelessly transmitted via the antenna (Step S114). Inter modulation distortion is generated in the amplifier 208; however, because the inter modulation distortion is canceled out by the distortion component that is added to the transmission signal, the distortion remaining in the amplified signal is small. Accordingly, the degradation of the adjacent channel leakage ratio (ACLR) can be suppressed.

Figure 5:
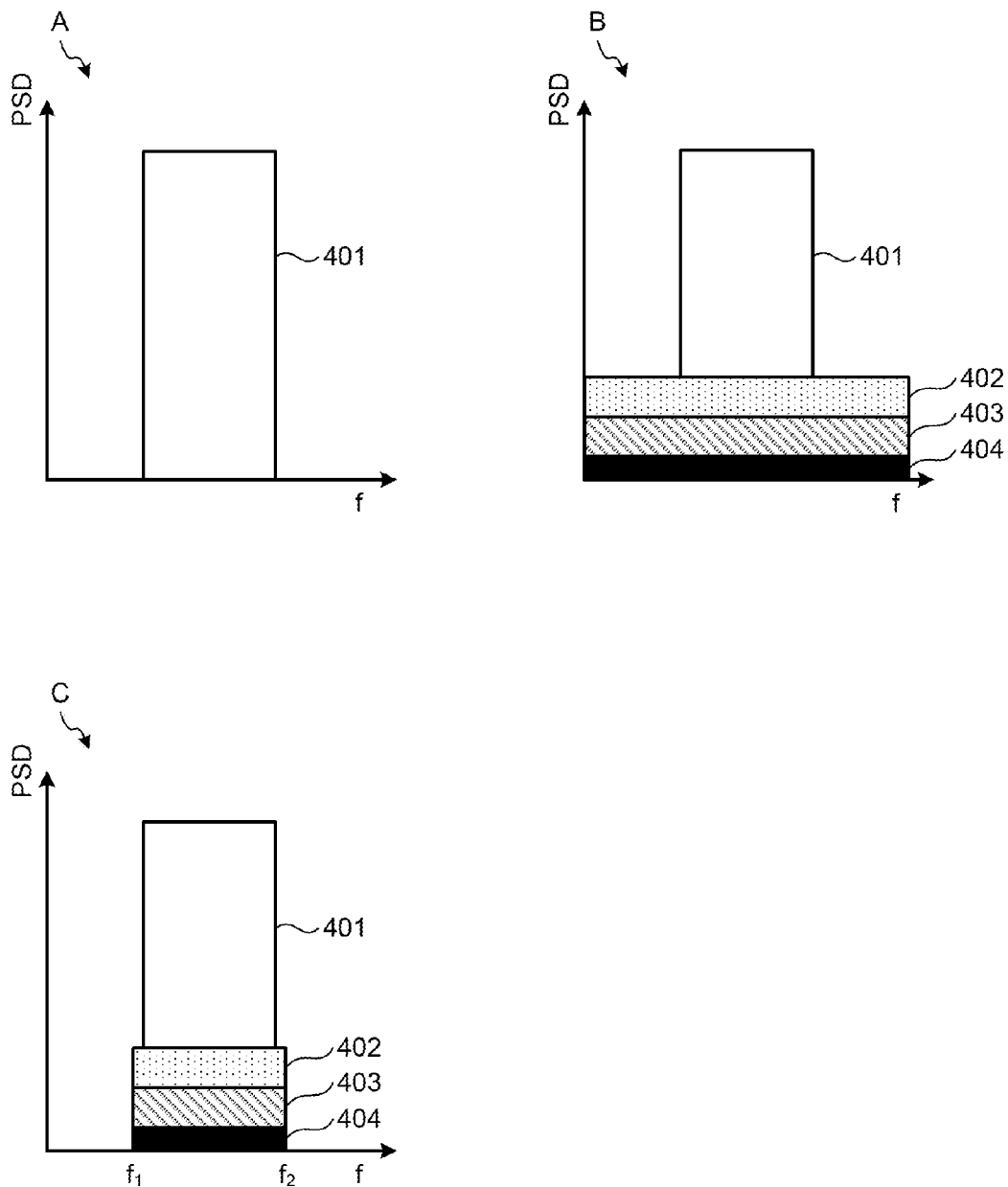
FIG. 5 is a schematic diagram illustrating a process related to a transmission signal.

In the following, a process related to the transmission signal and the distortion component will be described by using specific examples. FIG. 5 is a schematic diagram illustrating a process related to a transmission signal. In the schematic diagram indicated by A, B, and C illustrated in FIG. 5, the horizontal axis indicates the frequency and the vertical axis indicates the power spectral density.

As indicated by A illustrated in FIG. 5, a transmission signal 401 in a predetermined frequency band is generated in the transmission signal generating unit 101 in the base station device 100. After the transmission signal 401 is optically modulated and is transmitted by the optical fiber 300, as indicated by B illustrated in FIG. 5, shot noise 402, RIN 403, and thermal noise 404 are added to the transmission signal 401 in the entire frequency bands. Accordingly, the band-pass filter 203 performs filtering on the transmission signal 401 such that the transmission signal 401 is transmitted through the frequency band and, as indicated by C illustrated in FIG. 5, the noise outside the frequency band of the transmission signal 401 is removed. Specifically, in the diagram indicated by C illustrated in FIG. 5, the signal in the frequency band of $f_1$ to $f_2$ is transmitted through the band-pass filter 203 and the noise in the frequency band below the frequency $f_1$ and the noise in the frequency band above the frequency $f_2$ are removed.

In contrast, FIG. 6 is a schematic diagram illustrating a process related to a distortion component. In the schematic diagram indicated by D, E, F, and G illustrated in FIG. 6, the horizontal axis indicates the frequency and the vertical axis indicates the power spectral density.

As indicated by D illustrated in FIG. 6, the distortion acquiring unit 103 in the base station device 100 acquires a distortion component 501 based on the transmission signal level. The bandwidth of the distortion component 501 is greater than that of the transmission signal and the power spectral density of the distortion component 501 is smaller than that of the transmission signal. As indicated by E illustrated in FIG. 6, the distortion component 501 is amplified by the amplifying unit 104 and thus becomes a distortion component 502 that has the same level as that of the transmission signal. Namely, by amplifying the distortion component 501 using the gain corresponding to the ratio of the transmission signal level to the distortion component 501 level, the distortion component 502 having the same power spectral density as that of the transmission signal can be obtained.

After the distortion component 502 is optically modulated and is transmitted by the optical fiber 300, as indicated by F illustrated in FIG. 6, shot noise 503, RIN 504, and thermal noise 505 are added to the distortion component 502 in the entire bands. Then, the attenuating unit 205 attenuates the level of the distortion component 502 to the level before the amplification is performed by the amplifying unit 104. As indicated by G illustrated in FIG. 6, a distortion component 506 that has the same power spectral density as that of the distortion component 501 can be obtained. At this point, the shot noise 503 and the RIN 504 are also attenuated and become shot noise 507 and RIN 508, respectively. Accordingly, the power spectral density of the shot noise 507 and the RIN 508 is smaller than that of the shot noise 503 and the RIN 504. However, for the thermal noise, even if the thermal noise 505 is attenuated, thermal noise that is newly generated in the attenuating unit 205 is added to the distortion component; therefore, the power spectral density of thermal noise 509 becomes almost the same as that of the thermal noise 505.

Figure 7:
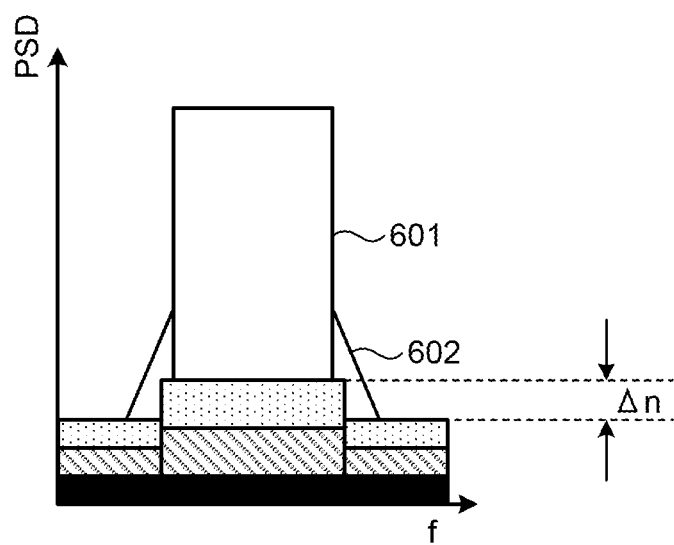
FIG. 7 is a schematic diagram illustrating a specific example of a signal that is input to an amplifier.

As described above, because the filtered transmission signal and the attenuated distortion component are combined by the combining unit 206, the combined signal becomes the signal illustrated in FIG. 7. In FIG. 7, the horizontal axis indicates the frequency and the vertical axis indicates the power spectral density. This combined signal is obtained by adding a distortion component 602 to a transmission signal 601 and contains noise. However, because noise is attenuated in the transmission signal 601 outside the frequency band, the power spectral density of the noise in the transmission signal 601 outside the frequency band is smaller than that in the transmission signal 601 inside the frequency band by Δn. Consequently, the degree of masking, due to noise, of the distortion component 602 is low outside the frequency band of the transmission signal 601 and thus the effect of predistortion can be sufficiently obtained.

As described above, according to the first embodiment, after the distortion component that is used to cancel out the inter modulation distortion is amplified and is separately transmitted, by the optical fiber, from the transmission signal, the transmission signal from which noise outside the frequency band is removed is combined with the distortion component that is attenuated to the original level. Then, the obtained combined signal is amplified by the amplifier and is wirelessly transmitted. Accordingly, noise is also attenuated outside the frequency band of the transmission signal, i.e., the combined signal, that is input to the amplifier; therefore, the degree of masking, due to noise, of the distortion component can be reduced. Consequently, even if a signal is to be transmitted by using an optical fiber, the inter modulation distortion that is generated in the amplifier can be compensated.

Furthermore, in the first embodiment described above, a description has been given of a case in which light onto which a transmission signal is superimposed and light onto which a distortion component is superimposed are subjected to wavelength division multiplexing (WDM) and are then transmitted by the optical fiber 300. However, in order to perform the transmission by using the optical fiber 300 in a manner in which the transmission signal can be separated from the distortion component, the wavelength division multiplexing does not always need to be performed. Namely, for example, a transmission signal and a distortion component may also be separately transmitted to the wireless device 200 by different optical fibers. Furthermore, dual-polarization quadrature phase shift keying (DP-QPSK) conversion may also be performed, in which a transmission signal and a distortion component are superimposed onto different planes of polarized light.

Figure 8:
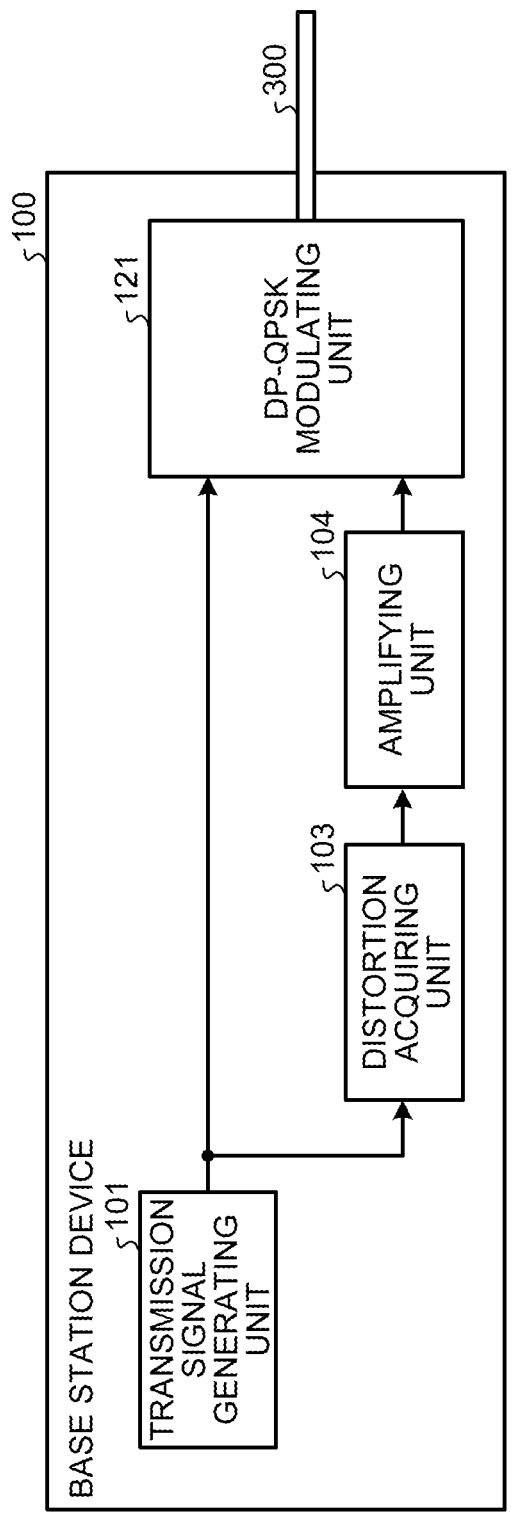
FIG. 8 is a block diagram illustrating a modification of a base station device according to the first embodiment.
Figure 9:
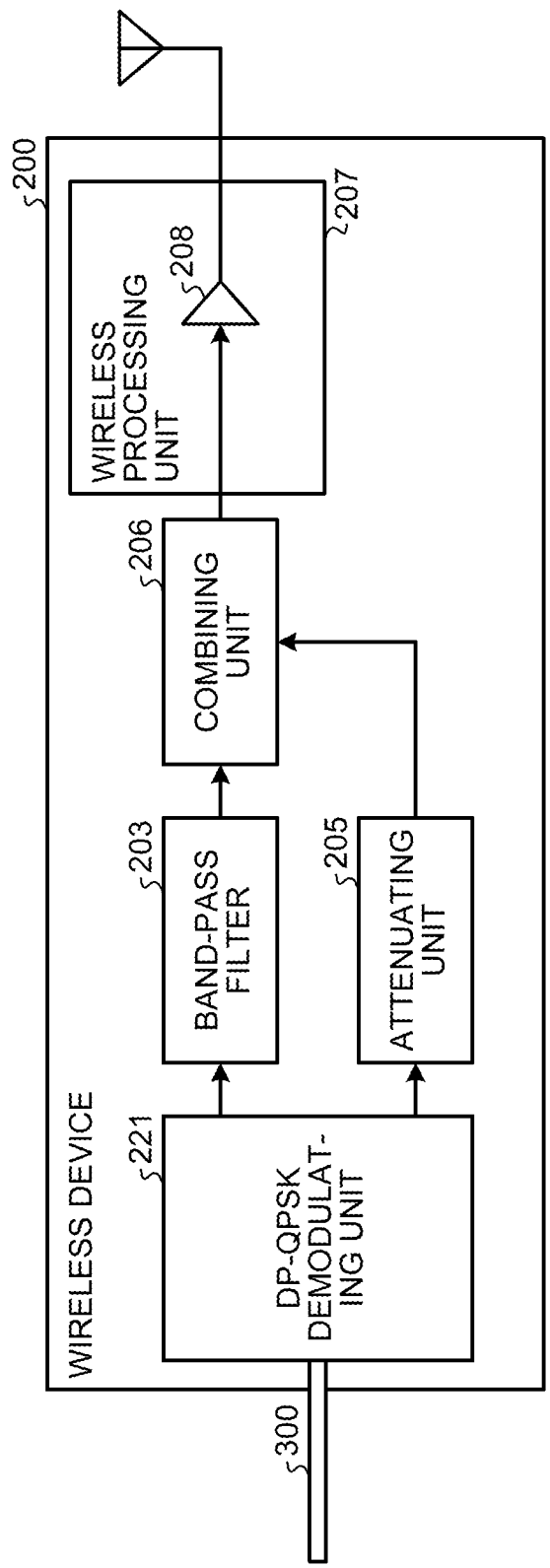
FIG. 9 is a block diagram illustrating a modification of a wireless device according to the first embodiment.

FIGS. 8 and 9 are block diagrams illustrating a base station device 100 and the wireless device 200, respectively, that are used when the DP-QPSK conversion is performed. In FIGS. 8 and 9, components having the same configuration as those illustrated in FIGS. 2 and 3 are assigned the same reference numerals. The base station device 100 illustrated in FIG. 8 includes a DP-QPSK modulating unit 121 instead of the optical modulating unit 102, the optical modulating unit 105, and the wavelength division multiplexing unit 106 in the base station device 100 illustrated in FIG. 2.

The DP-QPSK modulating unit 121 superimposes a transmission signal onto, for example, a horizontally polarized wave of the light emitted from a light source and superimposes an amplified distortion component onto, for example, a vertically polarized wave of the same light, thereby generating an optical signal. In this way, because the transmission signal and the distortion component are superimposed onto different planes of polarization of the optical signal, in the wireless device 200, the transmission signal can be separated from the distortion component.

Furthermore, the wireless device 200 illustrated in FIG. 9 includes a DP-QPSK demodulating unit 221 instead of the wavelength separating unit 201, the optical demodulating unit 202, and the optical demodulating unit 204 in the wireless device 200 illustrated in FIG. 3.

The DP-QPSK demodulating unit 221 demodulates the optical signal transmitted by the optical fiber 300; acquires a transmission signal superimposed onto, for example, a horizontally polarized wave; and acquires a distortion component superimposed onto, for example, a vertically polarized wave.

In this way, if a transmission signal can be separated from a distortion component in the wireless device 200, various modulation techniques can be used to generate an optical signal that is transmitted by the optical fiber 300.

[b] Second Embodiment

The feature of a second embodiment is present in that a feedback signal from a wireless device to a base station device is transmitted by an optical fiber.

In general, in order to improve the predistortion process, a signal amplified by an amplifier is fed back and the coefficient is updated such that a distortion component remaining in the feedback signal becomes closer to zero. Accordingly, in the second embodiment, a description will be given of a process in which a signal amplified by an amplifier is fed back from the wireless device to the base station device and the coefficient used for the predistortion is updated.

Figure 10:
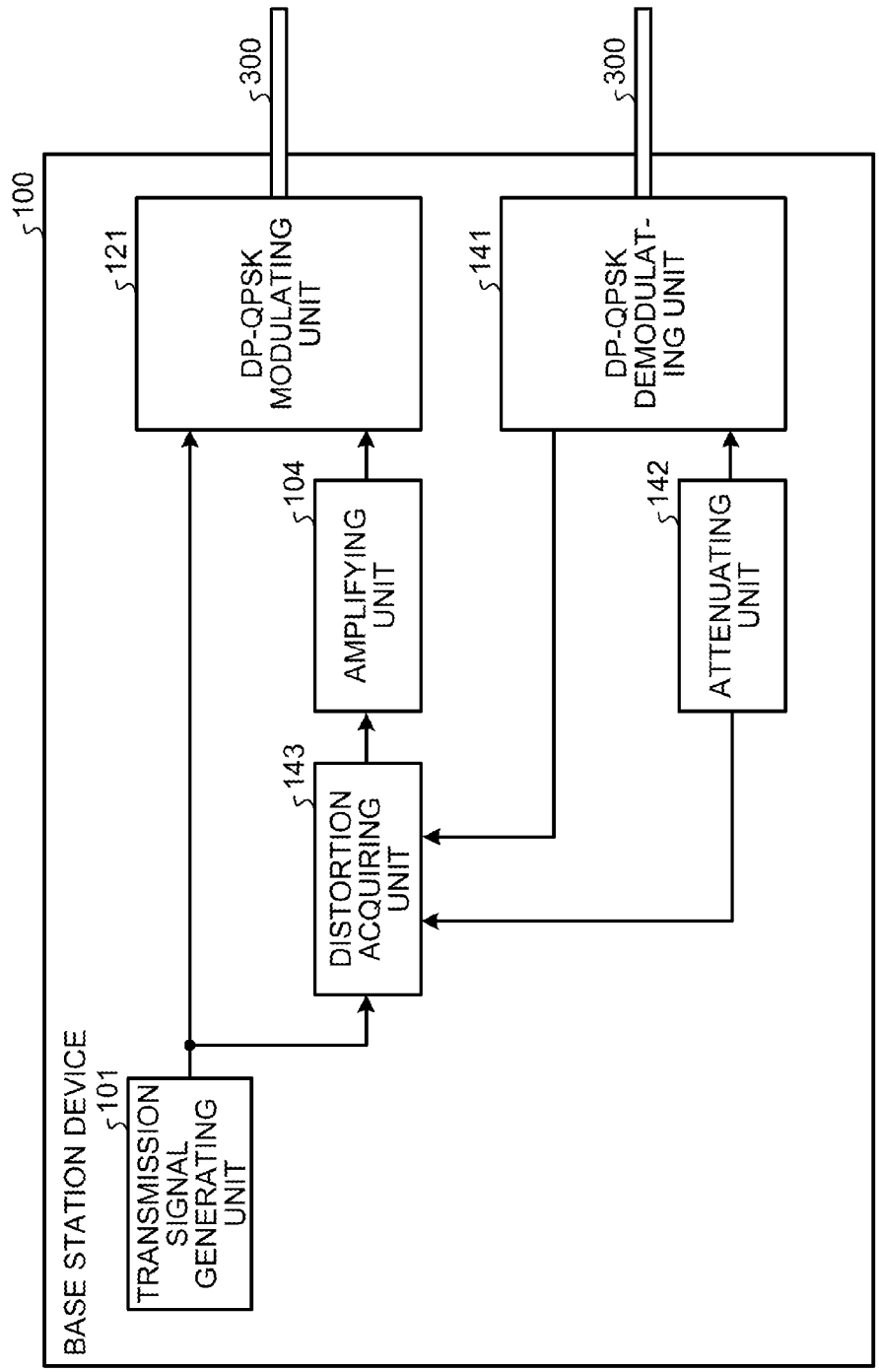
FIG. 10 is a block diagram illustrating the configuration of a base station device according to the second embodiment.

The configuration of the wireless transmission system according to the second embodiment is the same as that of the first embodiment (FIG. 1); therefore, a description thereof will be omitted. FIG. 10 is a block diagram illustrating the configuration of the base station device 100 according to the second embodiment. In FIG. 10, components having the same configuration as those illustrated in FIGS. 2 and 8 are assigned the same reference numerals. The base station device 100 illustrated in FIG. 10 has the configuration in which a DP-QPSK demodulating unit 141 and an attenuating unit 142 are added to the base station device 100 illustrated in FIG. 8 and a distortion acquiring unit 143 is included instead of the distortion acquiring unit 103.

The DP-QPSK demodulating unit 141 demodulates an optical signal that is fed back from the wireless device 200 via the optical fiber 300 and then acquires a main signal component and a remaining distortion component that are superimposed onto different planes of polarization of the optical signal. Namely, in the second embodiment, when a signal that has been amplified by the wireless device 200 is fed back, the main signal component and the remaining distortion component included in the amplified signal are subjected to the DP-QPSK conversion and are then fed back. Accordingly, the DP-QPSK demodulating unit 141 separates the fed back main signal component from the fed back remaining distortion component. The main signal component mentioned here indicates the component corresponding to the transmission signal that is generated by the transmission signal generating unit 101, whereas the remaining distortion component mentioned here indicates a distortion component remaining in the amplified signal that is not compensated even if the predistortion process is performed.

The attenuating unit 142 attenuates the remaining distortion component by using a gain inverse of the gain that has been used when the remaining distortion component is amplified in the wireless device 200. Namely, the attenuating unit 142 attenuates the remaining distortion component amplified in the wireless device 200 to the original level. At this point, the attenuating unit 142 also attenuates noise that is added to the remaining distortion component. Consequently, the level of the noise added to the remaining distortion component is lower than that of the noise added to the main signal component.

The distortion acquiring unit 143 acquires a distortion component that is associated with the level of the transmission signal generated by the transmission signal generating unit 101. At this point, the distortion acquiring unit 143 may also acquire a distortion component that is associated with the transmission signal level by using, for example, a memory polynomial or may also acquire a distortion component that is associated with the transmission signal level by referring to the look-up table that stores therein, in an associated manner, distortion components for each signal level. Furthermore, the distortion acquiring unit 143 updates the coefficient of the memory polynomial or the coefficient stored in the look-up table by using both the main signal component and the remaining distortion component that are fed back from the wireless device 200. Namely, the distortion acquiring unit 143 performs an update process of the coefficient such that the remaining distortion component that is to be fed back approaches zero.

Figure 11:
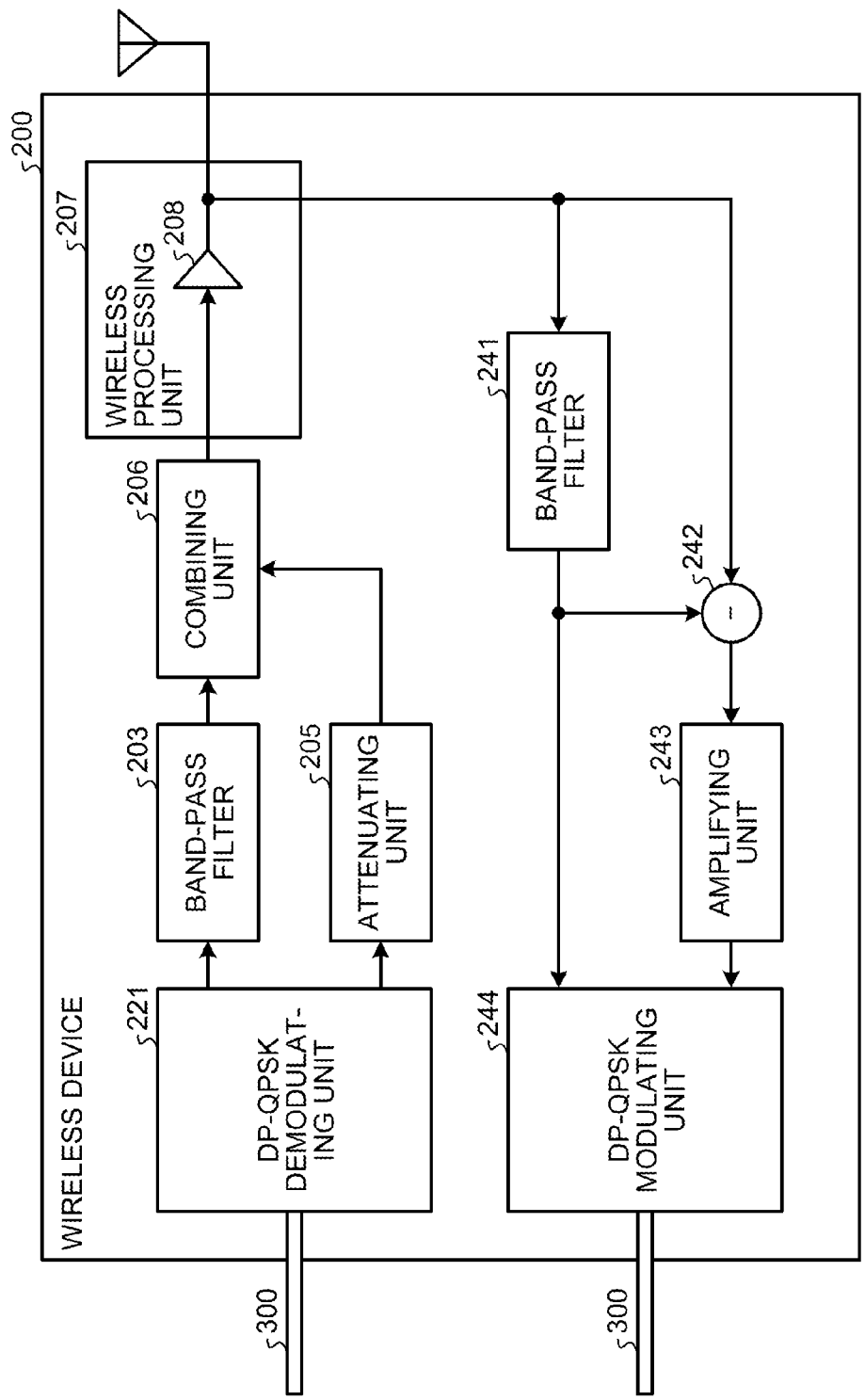
FIG. 11 is a block diagram illustrating the configuration of a wireless device according to the second embodiment.

FIG. 11 is a block diagram illustrating the configuration of the wireless device 200 according to the second embodiment. In FIG. 11, components having the same configuration as those illustrated in FIGS. 3 and 9 are assigned the same reference numerals and descriptions thereof will be omitted. The wireless device 200 illustrated in FIG. 11 has the configuration in which a band-pass filter 241, a subtracter 242, an amplifying unit 243, and a DP-QPSK modulating unit 244 are added to the wireless device 200 illustrated in FIG. 9.

The band-pass filter 241 acquires a main signal component by filtering the signal, which has been amplified by the amplifier 208, by using the frequency band of the transmission signal. Namely, because the frequency band of the transmission signal is previously determined, the band-pass filter 241 allows the signal of this frequency band to transmit, thus acquiring the main signal component that corresponds to the transmission signal.

The subtracter 242 subtracts the main signal component from the signal that has been amplified by the amplifier 208, thereby acquiring a remaining distortion component that remains in the amplified signal.

The amplifying unit 243 amplifies the remaining distortion component that is output from the subtracter 242. Specifically, the amplifying unit 243 amplifies a distortion component at the gain that makes the level of the remaining distortion component the same as that of the main signal component. In order to determine the gain, the amplifying unit 243 may also measure the level of each of the main signal component and the remaining distortion component, or alternatively, the amplifying unit 243 may also use a fixed value as the gain.

The DP-QPSK modulating unit 244 superimposes the main signal component onto, for example, the horizontally polarized wave of light emitted from the light source and superimposes the amplified remaining distortion component onto, for example, the vertically polarized wave of the same light, and thereby the DP-QPSK modulating unit 244 generates an optical signal. In this way, because the main signal component and the remaining distortion component are superimposed onto the different planes of polarization of the optical signal, in the base station device 100, the main signal component can be separated from the remaining distortion component.

In the following, a coefficient update process performed by the wireless transmission system having the above described configuration will be described by referring to the flowchart illustrated in FIG. 12. A description will be given below of a process that is performed after a signal has been amplified by the amplifier 208 in the wireless device 200.

The signal that has been amplified by the amplifier 208 is filtered by the band-pass filter 241 (Step S201). Namely, the main signal component in the frequency band of the predetermined transmission signal is output from the band-pass filter 241 and the remaining distortion component that remains in the amplified signal is removed.

Then, the subtracter 242 subtracts the main signal component from the signal that has been amplified by the amplifier 208, and thereby the remaining distortion component is acquired (Step S202). Because the acquired remaining distortion component is amplified by the amplifying unit 243 (Step S203), the level of the remaining distortion component becomes the same as that of the main signal component.

The main signal component and the remaining distortion component obtained in this way are subjected to the DP-QPSK modulation by the DP-QPSK modulating unit 244 (Step S204) and are superimposed onto the different polarization planes. Then, the optical signal that is obtained as the result of the DP-QPSK modulation is transmitted to the base station device 100 by the optical fiber 300 (Step S205).

The optical signal transmitted by the optical fiber 300 is received by the DP-QPSK demodulating unit 141 in the base station device 100. Then, the DP-QPSK demodulating unit 141 demodulates the optical signal (Step S206) and thereby the main signal component and the remaining distortion component are acquired. Because the remaining distortion component is amplified by the amplifying unit 243 in the wireless device 200, the remaining distortion component is attenuated by the attenuating unit 142 such that the level of the remaining distortion component returns to the original level (Step S207). Consequently, the noise added to the remaining distortion component in accordance with the transmission performed by the optical fiber 300 is also attenuated.

Then, the main signal component and the remaining distortion component are input to the distortion acquiring unit 143 and then the distortion acquiring unit 143 updates the coefficient of, for example, a memory polynomial such that the remaining distortion component becomes zero (Step S208). At this point, because the noise added to the remaining distortion component is attenuated, the degree of masking, due to noise, of the remaining distortion component is low and thus an accurate coefficient update process can be performed. Consequently, the efficiency of the distortion compensation due to predistortion can be improved.

As described above, according to the second embodiment, after a remaining distortion component remaining in a signal that has been amplified by an amplifier is amplified and is then fed back by using an optical fiber separately from a main signal component, the remaining distortion component is attenuated to the original level. Then, by using the fed back main signal component and the remaining distortion component, the coefficient used for the predistortion is updated. Accordingly, because the noise that is added to the remaining distortion component used for the coefficient update process is also attenuated, the degree of masking, due to noise, of the remaining distortion component can be reduced. Consequently, it is possible to perform an accurate coefficient update process and improve the efficiency of the distortion compensation due to the predistortion.

The distortion compensation process and the coefficient update process described in each of the embodiments may also be performed by a processor, such as a central processing unit (CPU), a digital signal processor (DSP), or the like, included in the base station device 100 or the wireless device 200. In such a case, the processor performs various kinds of arithmetic processing by storing data, which is to be used, in a memory. Specifically, the processor installed in the base station device 100 performs the processes performed by, for example, the transmission signal generating unit 101, the distortion acquiring unit 103, the amplifying unit 104, the attenuating unit 142, and the distortion acquiring unit 143 according to each of the embodiments. Furthermore, the processor installed in the wireless device 200 performs the processes performed by, for example, the attenuating unit 205, the combining unit 206, the subtracter 242, and the amplifying unit 243 according to each of the embodiments.

Furthermore, the distortion compensation process and the coefficient update process described above in each of the embodiments may also be described as a program that can be executed by a computer. In such a case, the program may also be stored in a computer readable recording medium and installed in the computer. Examples of the computer readable recording medium includes a portable recording medium, such as a CD-ROM, a DVD disk, a USB memory, and the like or a semiconductor memory, such as a flash memory and the like.

According to an aspect of an embodiment of the wireless transmission system and the distortion compensation method disclosed in the present invention, an advantage is provided in that inter modulation distortion generated in an amplifier can be compensated even if a signal is transmitted by using an optical fiber.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless transmission system in which a base station device is connected to a wireless device by an optical transmission member, wherein
   the base station device comprises
      an acquiring unit that acquires a distortion component that corresponds to a level of a transmission signal,
      an amplifying unit that amplifies the distortion component acquired by the acquiring unit at a predetermined gain, and
      a transmitting unit that transmits, to the wireless device via the optical transmission member, the transmission signal and the distortion component amplified by the amplifying unit in a separable manner, and
   the wireless device comprises
      a receiving unit that receives the transmission signal and the distortion component transmitted by the transmitting unit,
      a filtering unit that filters the transmission signal received by the receiving unit at a predetermined frequency band,
      an attenuating unit that attenuates the distortion component received by the receiving unit at a gain inverse of the predetermined gain used by the amplifying unit,
      a combining unit that combines the transmission signal filtered by the filtering unit with the distortion component attenuated by the attenuating unit to obtain a combined signal, and
      an amplifier that amplifies the combined signal obtained by the combining unit.

2. The wireless transmission system according to claim 1, wherein the transmitting unit includes
   an optical modulating unit that superimposes the transmission signal and the distortion component onto a plurality of pieces of light each having different wavelengths, respectively, and
   a wavelength multiplexing unit that multiplexes the pieces of light that have the different wavelengths and in which the transmission signal and the distortion component are superimposed by the optical modulating unit.

3. The wireless transmission system according to claim 1, wherein the transmitting unit includes an optical modulating unit that superimposes the transmission signal and the distortion component onto different planes of polarization of light, respectively.

4. The wireless transmission system according to claim 1, wherein the amplifying unit amplifies the distortion component at a gain that corresponds to a ratio of the level of the transmission signal to a level of the distortion component acquired by the acquiring unit.

5. A wireless transmission system according to claim 1 wherein,
   the wireless device further comprises
      a separating unit that separates a signal amplified by the amplifier into a main signal component of a frequency band of the transmission signal and a remaining distortion component of out of the frequency band of the transmission signal,
      a remaining distortion amplifying unit that amplifies the remaining distortion component separated by the separating unit at a predetermined gain, and
      a feedback transmitting unit that transmits, to the base station device via the optical transmission member, the main signal component and the remaining distortion component amplified by the remaining distortion amplifying unit in a separable manner, and
   the base station device further comprises
      a feedback receiving unit that receives the main signal component and the remaining distortion component transmitted by the feedback transmitting unit,
      a remaining distortion attenuating unit that attenuates the remaining distortion component received by the feedback receiving unit at a gain inverse of the predetermined gain used by the remaining distortion amplifying unit, and
      an updating unit that updates, based on the remaining distortion component attenuated by the remaining distortion attenuating unit, a coefficient that is used to acquire the distortion component by the acquiring unit.

6. A distortion compensation method performed in a wireless transmission system in which a base station device is connected to a wireless device by an optical transmission member, the distortion compensation method comprising:
  acquiring a distortion component that corresponds to a level of a transmission signal;
  amplifying the acquired distortion component at a predetermined gain;
  transmitting, via the optical transmission member from the base station device to the wireless device, the transmission signal and the amplified distortion component in a separable manner;
  filtering, at a predetermined frequency band, the transmission signal received by the wireless device;
  attenuating the distortion component received by the wireless device at a gain inverse of the predetermined gain used at the amplifying;
  combining the filtered transmission signal with the attenuated distortion component to obtain a combined signal; and
  amplifying, by an amplifier, the combined signal obtained at the combining.

* * * * *